United States Patent
Tashiro

(10) Patent No.: US 12,405,474 B2
(45) Date of Patent: Sep. 2, 2025

(54) OPTICAL SYSTEM AND IMAGE DISPLAY APPARATUS

(71) Applicant: CANON KABUSHIKI KAISHA, Tokyo (JP)

(72) Inventor: Yoshihisa Tashiro, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/665,677

(22) Filed: May 16, 2024

(65) Prior Publication Data

US 2024/0393594 A1 Nov. 28, 2024

(30) Foreign Application Priority Data

May 22, 2023 (JP) .................................. 2023-084164

(51) Int. Cl.
| | |
|---|---|
| *G02B 27/01* | (2006.01) |
| *G02B 9/10* | (2006.01) |
| *G02B 13/00* | (2006.01) |
| *G02B 27/12* | (2006.01) |

(52) U.S. Cl.
CPC ........... *G02B 27/0172* (2013.01); *G02B 9/10* (2013.01); *G02B 13/006* (2013.01); *G02B 27/123* (2013.01)

(58) Field of Classification Search
CPC .................................................. G02B 13/0045
See application file for complete search history.

(56) References Cited

U.S. PATENT DOCUMENTS

| | | | |
|---|---|---|---|
| 8,854,504 B2 | 10/2014 | Tashiro | |
| 9,555,589 B1 * | 1/2017 | Ambur | ..................... G02B 5/30 |
| 10,126,523 B2 | 11/2018 | Tashiro | |
| 10,606,095 B2 * | 3/2020 | Takagi | ................. G02B 17/086 |
| 11,327,274 B2 | 5/2022 | Tashiro | |
| 11,803,062 B1 * | 10/2023 | Huang | ..................... G02B 9/12 |
| 2006/0028740 A1 * | 2/2006 | Murakami | ......... G02B 13/0035 |
| | | | 359/784 |
| 2007/0024983 A1 * | 2/2007 | Yamamoto | .............. G02B 13/16 |
| | | | 359/649 |
| 2013/0342749 A1 | 12/2013 | Tashiro | |
| 2020/0064592 A1 * | 2/2020 | Tashiro | .............. G02B 27/0075 |
| 2023/0185094 A1 | 6/2023 | Tashiro | |
| 2023/0375765 A1 | 11/2023 | Tashiro | |

FOREIGN PATENT DOCUMENTS

WO    2022/038777 A1    2/2022

\* cited by examiner

*Primary Examiner* — Nan-Ying Yang
(74) *Attorney, Agent, or Firm* — Carter, DeLuca & Farrell LLP

(57) ABSTRACT

An optical system configured to guide light from a display element to an observation side includes a first lens having a first half-transmissive reflective surface provided to a surface on a display element side of the first lens, and a second lens having a second half-transmissive reflective surface. The light from the display element transmits through the second half-transmissive reflective surface, is reflected on the first half-transmissive reflective surface, is reflected on the second half-transmissive reflective surface, transmits through the first half-transmissive reflective surface, and is guided to the observation side. One of the first lens, the second lens, and another lens has negative refractive power. The first lens has a concave surface facing the observation side. A predetermined inequality is satisfied.

33 Claims, 6 Drawing Sheets

OPTICAL SYSTEM AND IMAGE DISPLAY APPARATUS

BACKGROUND

Technical Field

One of the aspects of the embodiments relates to an optical system suitable for an image display apparatus, such as a head mount display (HMD) and smart glasses.

Description of Related Art

An observation optical system that enlarges and displays an original image displayed on a display element such as a liquid crystal display (LCD), and enables a user to observe it is demanded to have a wide field, high optical performance, and reduced size. International Publication No. WO 2022/038777 discloses an observation optical system that includes a first lens having positive refractive power on an observation side, and a second lens having positive refractive power on a display element side, wherein a half-transmissive reflective surface having a flat shape is formed on a surface on the display element side of the first lens, and a half-transmissive reflective surface having a concave shape toward the observation side is provided on a surface on the display element side of the second lens. In this observation optical system, light from the display element transmits through the half-transmissive reflective surface of the second lens, is refracted by the positive optical power of the second lens, and is reflected on the half-transmissive reflective surface of the first lens. Next, the light is refracted by the positive optical power of the second lens and reflected by the positive optical power of the half-transmissive reflective surface of the second lens. Next, the light transmits through the half-transmissive reflective surface of the first lens, is refracted by the positive optical power of the first lens, and exits to the observation side. Thus, in the observation optical system disclosed in International Publication No. WO 2022/038777, when refracted or reflected, the light always receives positive optical power.

The observation optical system disclosed in International Publication No. WO 2022/038777 is configured so as not to optically correct chromatic aberration caused by refraction. In using an electronic display element such as an LCD as a display element, lateral chromatic aberration of the observation optical system can be electronically corrected by adjusting the magnification of an image displayed for each RGB color channel. However, chromatic aberration occurring within each RGB color channel cannot be electronically corrected. Therefore, in using a high-definition display element with a narrow pixel pitch, the quality of the displayed image may deteriorate due to chromatic aberration of the observation optical system.

SUMMARY

An optical system according to one aspect of the disclosure is configured to guide light from a display element to an observation side. The optical system includes a first lens having a first half-transmissive reflective surface provided to a surface on a display element side of the first lens, and a second lens having a second half-transmissive reflective surface. The light from the display element transmits through the second half-transmissive reflective surface, is reflected on the first half-transmissive reflective surface, is reflected on the second half-transmissive reflective surface, transmits through the first half-transmissive reflective surface, and is guided to the observation side. One of the first lens, the second lens, and another lens has negative refractive power. The first lens has a concave surface facing the observation side. The following inequality is satisfied:

$$0 \le |fn/f| \le 20.0$$

where fn is a focal length of the one having the negative refractive power, and f is a focal length of the optical system. A display apparatus having the above optical system also constitutes another aspect of the disclosure.

An optical system according to another aspect of the disclosure is configured to guide light from a display element to an observation side. The optical system includes a first lens having a first half-transmissive reflective surface, and a second lens having a second half-transmissive reflective surface. The light from the display element transmits through the second half-transmissive reflective surface, is reflected on the first half-transmissive reflective surface, is reflected on the second half-transmissive reflective surface, transmits through the first half-transmissive reflective surface, and is guided to the observation side. One of the first lens, the second lens, and another lens has negative refractive power. The light from the display element transmits through the one having the negative refractive power only once and is guided to the observation side. A display apparatus having the above optical system also constitutes another aspect of the disclosure.

An optical system according to another aspect of the disclosure is configured to guide light from a display element to an observation side. The optical system includes a first lens having a first half-transmissive reflective surface provided to a surface on a display element side of the first lens, and a second lens having a second half-transmissive reflective surface. The light from the display element transmits through the second half-transmissive reflective surface, is reflected on the first half-transmissive reflective surface, is reflected on the second half-transmissive reflective surface, transmits through the first half-transmissive reflective surface, and is guided to the observation side. One of the first lens, the second lens, and another lens has negative refractive power. The first half-transmissive reflective surface has a curved shape. The following inequality is satisfied:

$$1.0 \le |fn/f| \le 20.0$$

where fn is a focal length of the one having the negative refractive power, and f is a focal length of the optical system. A display apparatus having the above optical system also constitutes another aspect of the disclosure.

Further features of various embodiments of the disclosure will become apparent from the following description of embodiments with reference to the attached drawings.

DESCRIPTION OF THE EMBODIMENTS

Figure 1:
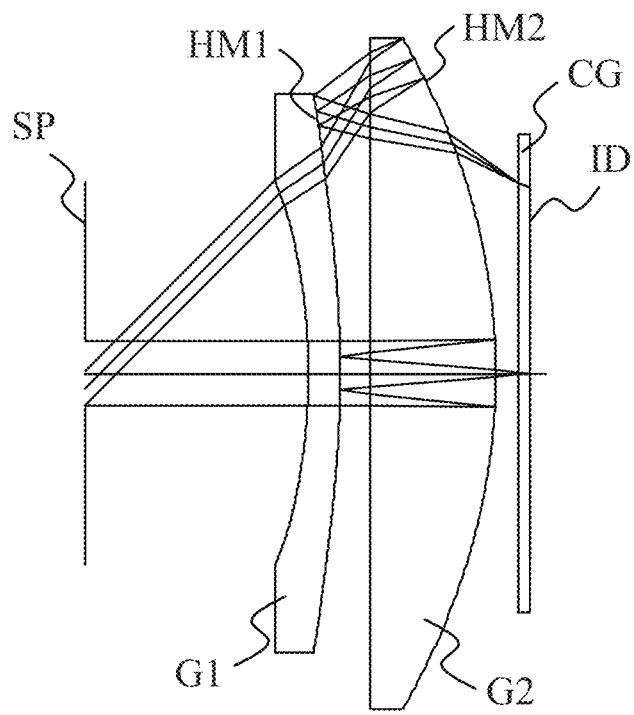
FIG. 1 is a sectional view of an observation optical system according to Example 1.

Examples of the present disclosure will be described below with reference to the accompanying drawings. FIGS. 1, 3, 5, and 7 illustrate the configurations of observation optical systems according to Examples 1, 2, 3, and 4, respectively.

Prior to a specific description according to Examples 1 to 4, common matters to each example will be described. The observation optical system according to each example is used for an image display apparatus such as an HMD or smart glasses, enlarges and displays an image displayed on a display element, and enables an observer (user) to observe it.

The observation optical system includes, in order from an observation side (pupil plane side of the observation optical system where the observer's eyes are disposed) to a display element side, a first lens G1 having a first half-transmissive reflective surface HM1, and a second lens G2 having a second half-transmissive reflective surface HM2. The first half-transmissive reflective surface HM1 is provided to a surface on the display element side of the first lens G1, and the second half-transmissive reflective surface HM2 is provided to a surface on the observation side or display element side surface of the second lens G2.

The observation optical system according to each example adopts a triple-pass configuration in which a light beam from the display element transmits through HM2, is reflected on HM1, is reflected on HM2, transmits through HM1, and is guided to the observation side. Such a triple-pass configuration can reduce the thickness of the observation optical system and secure the optical path length.

The observation optical system according to each example utilizes polarized light in the triple-pass configuration as described below. Thereby, changes in polarization characteristics due to birefringence or the like in the first lens G1 do not affect unnecessary light such as ghosts, and a degree of freedom can be secured in the material selection and processing method for the first lens G1. Further, by sharing strong positive optical power using the reflection action of the second half-transmissive reflective surface HM2 disposed in the second lens G2, the observation optical system can realize a wide angle of field.

The observation optical system according to each example includes a proper negative lens Gn, and thereby suppresses an increase in the size of the observation optical system and an increase in curvature of field, and satisfactorily corrects chromatic aberration. More specifically, the observation optical system has at least one of the following configurations 1 and 2 regarding the negative lens Gn. The negative lens Gn may be provided to any of the first lens G1, the second lens G2, and another lens.

Configuration 1

The following inequality is satisfied:

$$1.0 \le |fn/f| \le 20.0 \quad (1)$$

where fn is a focal length of the negative lens Gn in air, and f is a focal length of the entire observation optical system in air.

Properly setting the focal length of the negative lens Gn can widen the angle of field, reduce the size of the observation optical system, and satisfactorily correct chromatic aberration. In a case where |fn/f| becomes lower than the lower limit of inequality (1), the optical power of the negative lens Gn becomes too strong for the optical power of the entire observation optical system, and chromatic aberration is overcorrected and a wide angle of field becomes difficult. In addition, in a case where the negative lens Gn is disposed on the observation side where longitudinal chromatic aberration and lateral chromatic aberration can be easily corrected, the optical arrangement becomes such that the negative lens Gn significantly diverges the rays, and the optical effective diameter of the second lens G2 (diameter of a portion through which the rays contributing to imaging pass) increases. On the other hand, in a case where |fn/f| becomes higher than the upper limit of inequality (1), the optical power of the negative lens Gn becomes too weak for the optical power of the entire observation optical system, and correction of chromatic aberration becomes insufficient.

Inequality (1) may be replaced with the following inequality (1a):

$$1.3 \le |fn/f| \le 17.0 \quad (1a)$$

Inequality (1) may be replaced with the following inequality (1b):

$$1.6 \le |fn/f| \le 14.0 \quad (1b)$$

Configuration 2

The negative lens Gn is disposed in an optical path as a single path in which a ray from the display element passes through the negative lens Gn only once. The negative lens Gn disposed in the single path can correct both curvature of field and chromatic aberration of the observation optical system in a well-balanced manner. The observation optical system using two half-transmissive reflective surfaces as in each example can achieve a wide angle of field of the observation optical system by sharing strong positive power using the reflection action of at least one of the half-transmissive reflective surfaces.

Here, the Petzval term generated at the reflective surface has a different sign from the Petzval term generated at the refractive surface. In other words, in order to correct the Petzval image plane generated by the reflective surface having positive optical power, a refractive surface having positive optical power (a lens having positive refractive power) is required. Therefore, in placing a negative lens within an observation optical system using two half-transmissive reflective surfaces, it is important to properly set the lens arrangement within the observation optical system. In using a negative lens to correct chromatic aberration, in a case where the negative lens is placed in the triple pass of the observation optical system, three negative refraction effects are applied to the light beam, and it becomes difficult to correct curvature of field. Therefore, the negative lens is disposed in the single pass of the observation optical system to apply only one negative refraction effect to the light beam and correct both curvature of field and chromatic aberration. Further, in adopting a configuration using polarized light, which will be described below, unnecessary light such as ghosts is generated due to the birefringence of the optical material. In the single pass, the optical path length passing through the optical medium is one-third as long as that of the triple pass, so the influence of the birefringence of the optical material can also be reduced down to one-third. From this point of view as well, the negative lens Gn for correcting chromatic aberration may be disposed in a single pass.

Properly setting the basic configuration of the observation optical system having the two half-transmissive reflective surfaces described above and the configuration relating to the negative lens Gn can provide the observation system with a wide angle of field, a thin structure, and high optical performance that can satisfactorily correct chromatic aberration.

In each example, the negative lens Gn is made of a resin material. The resin material is beneficial to reducing weight in comparison with using a glass material.

In each example, vdn is an Abbe number of the negative lens Gn based on the d-line. fp is a focal length in air of the positive lens having the largest refractive power among at least one positive lens included in the observation optical system. HM2_refR is a radius of curvature (reference radius of curvature) of a spherical surface passing through a surface vertex on the optical axis of the second half-transmissive reflective surface HM2 disposed on the second lens G2 and an end position of the optical effective diameter of the second half-transmissive reflective surface HM2. HM1_refR is a radius of curvature (reference radius of curvature) of a spherical surface passing through a surface vertex on the optical axis of the first half-transmissive reflective surface HM1 disposed on the first lens G1 and an end position of the optical effective diameter of the first half-transmissive reflective surface HM1. In a case where the reference radius of curvature is negative, it means that the half-transmissive reflective surface has a concave shape toward the observation side, and in a case where it is positive, it means that the half-transmissive reflective surface has a convex shape toward the observation side.

OAL is a distance on the optical axis from a surface vertex on the optical axis of a surface closest to an observation surface (pupil plane) in the observation optical system to the display surface of the display element. In a case a glass block such as a cover glass that does not have refractive power is provided near the display element, the distance OAL includes a distance obtained by converting the length of the glass block into the air conversion length.

Under the above definition, at least one of the following inequalities (2) to (7) may be satisfied:

$$10.0 \leq vdn \leq 40.0 \quad (2)$$

$$-1.1 \leq fp/fn \leq -0.1 \quad (3)$$

$$1.0 \leq fp/f \leq 8.0 \quad (4)$$

$$-5.0 \leq HM2\_refR/f \leq -1.0 \quad (5)$$

$$-0.2 \leq HM2\_refR/HM1\_refR \leq 1.0 \quad (6)$$

$$0.5 \leq OAL/f \leq 1.5 \quad (7)$$

Inequality (2) defines a proper range of the Abbe number based on the d-line of the negative lens Gn disposed in the observation optical system. Properly setting the Abbe number of the negative lens Gn can correct chromatic aberration and monochromatic aberration such as curvature of field. In a case where vdn becomes lower than the lower limit of inequality (2), chromatic aberration in the entire observation optical system is overcorrected, and the transmittance of the entire observation optical system decreases due to the large internal absorption of the lens material. In a case where vdn becomes higher than the upper limit of inequality (2), the correction of chromatic aberration in the entire observation optical system becomes insufficient, or it becomes necessary to provide stronger negative refractive power to the negative lens Gn in order to correct chromatic aberration and it becomes thus difficult to correct chromatic aberration and monochromatic aberration.

Inequality (3) defines a proper range of the ratio of the focal length in air of the negative lens Gn disposed in the observation optical system and the positive lens with the largest refractive power disposed in the observation optical system. Properly setting the focal lengths of the negative lens Gn and the positive lens can correct chromatic aberration and curvature of field. In a case where fp/fn becomes lower than the lower limit of inequality (3), the refractive power of the positive lens is too small for the negative lens Gn, the positive refractive power of the entire observation optical system becomes too weak, and it becomes difficult to correct curvature of field. In a case where fp/fn becomes higher than the upper limit of inequality (3), the refractive power of the positive lens will be too large for the negative lens Gn, and correction of chromatic aberration in the entire observation optical system becomes insufficient.

Inequality (4) defines a proper range of a ratio of the focal length in air of the positive lens with the largest refractive power disposed in the observation optical system to the focal length of the entire observation optical system. Properly setting the focal length of the positive lens can satisfactorily correct curvature of field and control chromatic aberration. In a case where the refractive power of the positive lens is too large so that fp/f becomes lower than the lower limit of inequality (4), it is beneficial to correcting curvature of field, but the chromatic aberration caused by the refractive action of the positive lens becomes too large. In a case where the refractive power of the positive lens is too small so that fp/f becomes higher than the upper limit of inequality (4), it becomes difficult to correct curvature of field in the entire observation optical system.

Inequality (5) defines a proper range of the reference radius of curvature of the second half-transmissive reflective surface HM2 disposed on the second lens G2. Due to the second half-transmissive reflective surface HM2 disposed as a reflective surface (concave mirror) having positive power during reflection action, the observation optical system can have a wide angle of field (high magnification). In a case where HM2_refR/f becomes too large (to the negative side) and becomes lower than the lower limit of inequality (5), the positive power obtained during reflection action becomes too weak, and it becomes difficult to widen the angle of field of the observation optical system. In a case where HM2_refR/f becomes higher than the upper limit of inequality (5), the positive power obtained during reflection action becomes too strong, and it becomes difficult to correct the curvature of field.

Inequality (6) defines a proper range of a ratio of the reference radius of curvature of the first half-transmissive reflective surface HM1 disposed on the first lens G1 to the reference radius of curvature of the second half-transmissive reflective surface HM2 disposed on the second lens G2. Properly setting the reference radii of curvature of these two half-transmissive reflective surfaces can reduce the size of the observation optical system, widen the angle of field, and satisfactorily correct curvature of field. In a case where the ratio becomes lower than the lower limit of inequality (6), the reference radii of curvature of HM1 and HM2 have different signs (a concave and a convex or a convex and a concave), and the reference radius of curvature of HM2 becomes too small for the reference radius of curvature of HM1. At this time, in a case where HM2 has a convex shape toward the observation side, HM2 becomes a convex mirror with strong negative power during reflection action, and HM1 becomes a convex mirror with negative power during reflection action. As a result, the positive power cannot be shared due to the reflection actions of the two half-transmissive reflective surfaces, and it becomes difficult to widen the angle of field of the observation optical system. Further, in a case where HM2 has a concave shape toward the observation side, HM2 becomes a concave mirror having strong positive power during reflection action, and HM1 becomes a concave mirror having positive power during reflection action. As a result, it becomes difficult to correct the curvature of field that occurs on the reflective surface of positive power. On the other hand, in a case where the ratio becomes higher than the upper limit of inequality (6), the reference radii of curvature of HM1 and HM2 have the same sign, and the reference radius of curvature of HM2 becomes too large for the reference radius of curvature of HM1. At this time, in a case where the two half-transmissive reflective surfaces both have a convex shape toward the observation side, HM1 becomes a concave mirror with strong positive power during reflection action, and HM2 becomes a convex mirror with negative power during reflection action. As a result, the two half-transmissive reflective surfaces are not concentrically arranged so as to have symmetry with respect to the exit pupil of the observation optical system, and it becomes difficult to correct aberrations that occur off the optical axis. Furthermore, in a case where both of the two half-transmissive reflective surfaces have a concave shape toward the observation side, HM1 becomes a convex mirror with strong negative power during reflection action, and HM2 becomes a concave mirror with positive power during reflection action. As a result, it becomes difficult to widen the angle of field of the observation optical system, and the outer diameter of the second lens G2 increases due to the strong light divergence action of HM1 as a convex mirror.

Inequality (7) defines a proper range of a ratio of the overall optical length of the observation optical system (hereinafter referred to as the overall lens length) to the focal length of the entire observation optical system. The observation optical system according to each example forms a triple path using two the half-transmissive reflective surfaces and has the configuration beneficial to reducing the overall length of the lens. In a case where OAL/f becomes lower than the lower limit of inequality (7), the overall lens length becomes too small for the focal length of the entire observation optical system. At this time, in order to satisfy this condition and ensure the edge thickness of the second lens G2, it becomes difficult to give a large curvature to the second half-transmissive reflective surface HM2. That is, since strong positive power cannot be shared during the reflection action of the second half-transmissive reflective surface HM2, it becomes difficult to widen the angle of field of the observation optical system. In a case where OAL/f becomes higher than the upper limit of inequality (7), the overall lens length becomes too large for the focal length of the entire observation optical system, and it becomes difficult to utilize the triple pass with the two half-transmissive reflective surfaces, and the size of the optical system increases.

Inequalities (2) to (7) may be replaced with the following inequalities (2a) to (7a):

$$13.0 \le vdn \le 35.0 \tag{2a}$$
$$-1.0 \le fp/fn \le -0.2 \tag{3a}$$
$$2.0 \le fp/f \le 7.0 \tag{4a}$$
$$-4.0 \le HM2\_refR/f \le -1.4 \tag{5a}$$
$$-0.1 \le HM2\_refR/HM1\_refR \le 0.8 \tag{6a}$$
$$0.6 \le OAL/f \le 1.3 \tag{7a}$$

Inequalities (2) to (7) may be replaced with the following inequalities (2b) to (7b):

$$16.0 \le vdn \le 30.0 \tag{2b}$$
$$-0.9 \le fp/fn \le -0.3 \tag{3b}$$
$$3.0 \le fp/f \le 6.0 \tag{4b}$$
$$-3.5 \le HM2\_refR/f \le -1.8 \tag{5b}$$
$$0.0 \le HM2\_refR/HM1\_refR \le 0.6 \tag{6b}$$
$$0.7 \le OAL/f \le 1.1 \tag{7b}$$

The negative lens Gn may be disposed closest to the observation surface (pupil plane) of the observation optical system (see Examples 1 and 4). The negative lens Gn disposed at a position closest to the observation surface where the heights of both the object paraxial ray and the pupil paraxial ray are large enables longitudinal chromatic aberration and lateral chromatic aberration to be satisfactorily corrected. In this case, the negative lens Gn may be disposed as the first lens G1. Providing the negative lens Gn and the first lens G1 having the first half-transmissive reflective surface HM1 as the same lens can reduce the number of lenses in the observation optical system and the weight of the observation optical system. The first half-transmissive reflective surface HM1 disposed on the first lens G1 may be formed as a curved surface. The first half-transmissive reflective surface HM1 as a curved surface can share the power during transmission and reflection action, and secure a degree of freedom in correcting aberrations.

The negative lens Gn may be disposed closer to the display element than the first lens G1 (see Examples 2 and 3). The negative lens Gn disposed on the display element side where the height of the pupil paraxial ray is large enables lateral chromatic aberration, in particular, to be satisfactorily corrected. In this case, the negative lens Gn may be cemented with the second lens G2 to form a cemented lens. Cementing the negative lens Gn and the second lens G2 can reduce the air gap between the lenses and thereby the overall length of the lens.

The second half-transmissive reflective surface HM2 of the second lens G2 may be disposed on the cemented surface of the second lens G2 and the negative lens Gn. This configuration can avoid total reflection, which is a problem when the second half-transmissive reflective surface HM2 is provided with a strong positive power reflection effect in order to widen the angle of field of the observation optical system. Since the cemented surface is less exposed to the external environment, it is beneficial to environmental resistance in a case where a half-mirror made of a metal film or a dielectric multilayer film is used as a half-transmissive reflective surface.

The first half-transmissive reflective surface HM1 of the first lens G1 may be a flat surface (see Example 2). In a configuration utilizing polarized light, which will be described below, polarizing elements (a polarization-selective half-transmissive reflective element and a quarter waveplate in FIG. 9, which will be described below, and a linear polarizing plate and a quarter waveplate in FIG. 10, which will be described below) are cemented and provided on the flat surface, the thickness of the observation optical system can be reduced. The flat cemented surface with the polarizing element can facilitate the bonding process of the polarizing element.

At least one of the two half-transmissive reflective surfaces may include a polarization-selective half-transmissive reflective element. This configuration can block unnecessary light such as ghosts caused by polarized light in the configuration utilizing the polarized light, which will be described below. Examples of the polarization-selective half-transmissive reflective element include a wire grid element such as WGF manufactured by Asahi Kasei, a reflective linear polarizing element such as IQP-E manufactured by 3M, and a circularly polarized reflective element using cholesteric liquid crystal. In using a reflective linear polarizing element, a quarter waveplate is disposed between two half-transmissive reflective surfaces.

The polarizing element is omitted in the drawings in each example. Various methods can be selected for placing the polarizing element, such as cementing a film-shaped polarizing element with the optical surface of the lens, or integrally molding a wire grid structure with the lens base material in molding the resin lens.

A description will be given of the configuration using polarized light. This configuration can suppress a decrease in a light amount on the regular optical path within the observation optical system, and reduce unnecessary light (leakage light), such as ghosts, that passes through the half-transmissive reflective surface and travels towards the observation side without being reflected even once.

First Configuration Using Polarized Light

Figure 9:
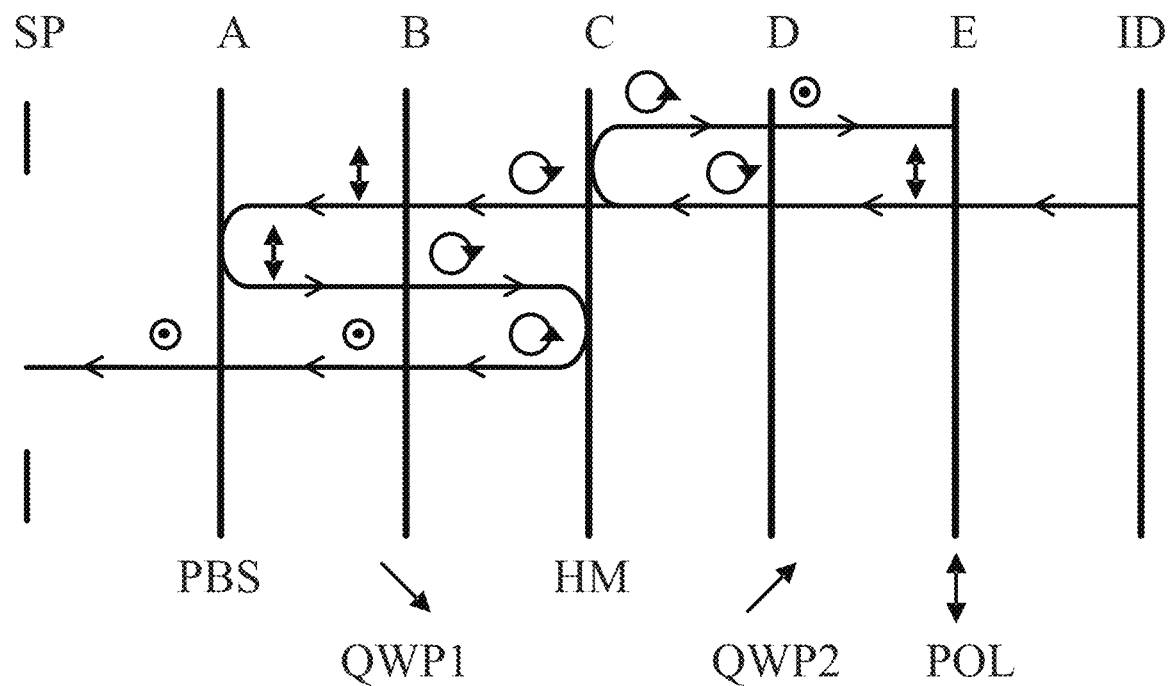
FIG. 9 illustrates a configuration using polarized light.

FIG. 9 illustrates a first configuration using polarized light. The first configuration includes a polarization-selective half-transmissive reflective element (PBS) A disposed on the observation side (pupil plane SP side), a half-mirror (HM) C disposed on the display element side (display surface ID side), a first quarter waveplate (QWP1) B disposed between PBS and HM, and a second quarter waveplate (QWP2) D and a linear polarizing plate (POL) E arranged in order from HM side between HM and ID.

PBS is configured to reflect linearly polarized light in the same polarization direction as that of the linearly polarized light that transmits through POL, and to transmit linearly polarized light in a polarization direction orthogonal to that of the linearly polarized light. PBS is, for example, a wire grid polarizer or a reflective polarizer having a retardation film laminated structure. In this case, the wire grid forming surface or the retardation film surface of the PBS functions as the second half-transmissive reflective surface.

QWP1 and QWP2 are disposed so that their slow axes are tilted by 45 degrees relative to the polarized light transmission axis of POL. The slow axes of QWP1 and QWP2 may be disposed such that their respective slow axes are tilted by 90 degrees with respect to each other. In a case where a light beam transmits through QWP1 and QWP2, this configuration can cancel out their wavelength dispersion characteristics.

HM is a half-mirror made, for example, of a dielectric multilayer film or metal vapor deposition, and functions as the first half-transmissive reflective surface. POL is, for example, an absorption type linear polarizer.

The unpolarized light emitted from ID becomes first linearly polarized light by POL, and the first linearly polarized light is converted into first circularly polarized light by QWP2 and enters HM. A part of the first circularly polarized light incident on HM is reflected by HM and becomes second circularly polarized light that rotates in a direction opposite to that of the first circularly polarized light, and the second circularly polarized light returns to QWP2. The second circularly polarized light that has returned to QWP2 is converted into second linearly polarized light whose polarization direction is orthogonal to the polarization direction of the first linearly polarized light. The second linearly polarized light returns to POL and is absorbed there.

On the other hand, the other part of the first circularly polarized light incident on HM transmits through HM and is converted into third linearly polarized light having the same polarization direction as that of the first linearly polarized light, and the third linearly polarized light enters PBS. The third linearly polarized light incident on the PBS is reflected by the polarization selectivity of PBS.

The third linearly polarized light reflected by PBS is converted by QWP1 into third circularly polarized light that rotates in the same direction as that of the first circularly polarized light. The third circularly polarized light enters HM and is reflected, thereby becoming fourth circularly polarized light that rotates in a direction opposite to that of the third circularly polarized light. The fourth circularly polarized light enters QWP1 and is converted into fourth linearly polarized light whose polarization direction is orthogonal to the polarization direction of the third linearly polarized light. The fourth linearly polarized light enters PBS, transmits through PBS due to the polarization selectivity of PBS, and is guided to SP.

Due to the above optical actions, only light that transmits through HM, is reflected by PBS, is reflected by HM, and transmits through PBS is guided to SP and enters the eye (pupil) of an observer placed at SP.

Second Configuration Using Polarized Light

Figure 10:
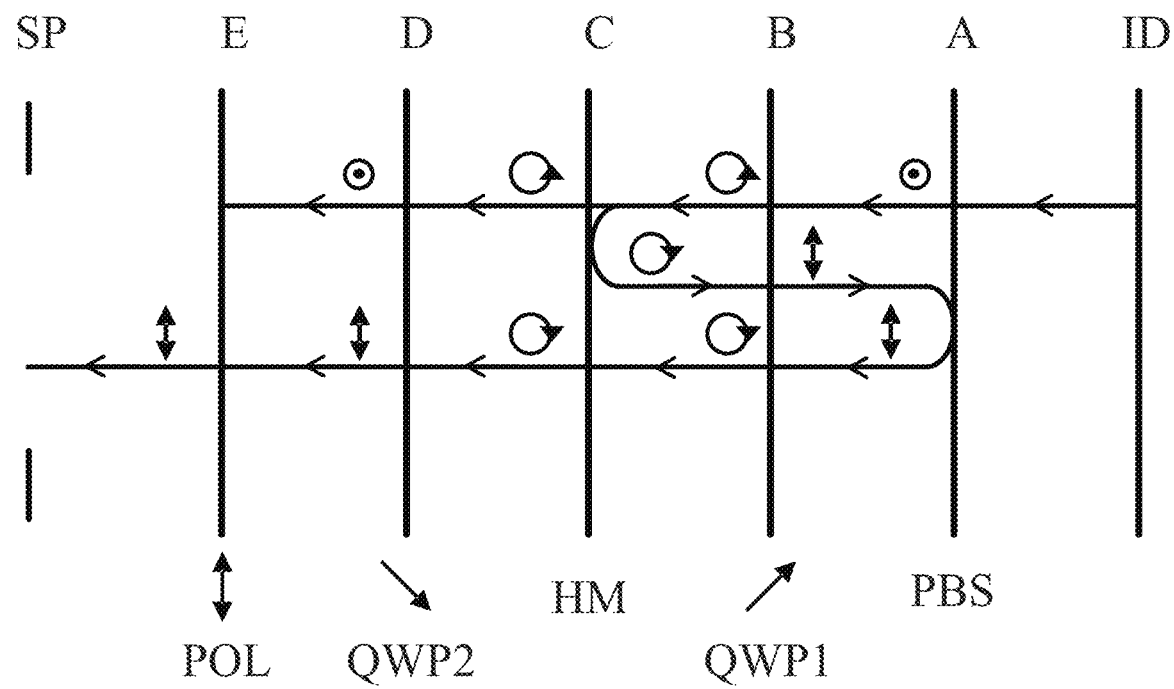
FIG. 10 illustrates another configuration using polarized light.

FIG. 10 illustrates a second configuration using polarized light. The second configuration includes a polarization-selective half-transmissive reflective element (PBS) A disposed on the display element side (display surface ID side), a half-mirror (HM) C disposed on the observation side (pupil plane SP side), a first quarter waveplate (QWP1) B disposed between PBS and HM, a second quarter waveplate (QWP2) D and a linear polarizing plate (POL) E arranged in order from HM side between HM and SP. The configuration of each element and the orientation of the optical axis are the same as those of the first configuration.

The unpolarized light emitted from ID enters PBS. Due to the wavelength selectivity of PBS, among the unpolarized light incident on PBS, the first linearly polarized light having the polarization direction orthogonal to the transmission axis of POL transmits through PBS. The first linearly polarized light that has transmitted through PBS is converted into first circularly polarized light by QWP1, and the first circularly polarized light enters HM. A part of the first circularly polarized light incident on HM transmits through HM, enters the QWP2, and is converted into second linearly polarized light having the same polarization direction as that of the first linearly polarized light. The second linearly polarized light enters POL and is absorbed by POL.

On the other hand, the other part of the first circularly polarized light incident on HM is reflected by HM and becomes second circularly polarized light that rotates in a direction opposite to that of the first circularly polarized light, and the second circularly polarized light returns to QWP1. The second circularly polarized light that has returned to QWP1 is converted by QWP1 into third linearly polarized light whose polarization direction is orthogonal to the polarization direction of the first linearly polarized light. The third linearly polarized light returns to PBS. The third linearly polarized light that has returned to PBS is reflected by the polarization selectivity of PBS, returns to QWP1 again, and is converted into third circularly polarized light that rotates in the same direction as that of the first circularly polarized light. The third circularly polarized light enters HM again, transmits through HM, enters QWP2, and is converted by QWP2 into fourth linearly polarized light whose polarization direction is parallel to the transmission axis of POL. The fourth linearly polarized light transmits through POL and is guided to SP.

Due to the above optical actions, only the light that transmits through PBS, is reflected by HM, is reflected by PBS, and transmits through HM is guided to the SP and enters the eye of an observer placed at SP.

In the observation optical system according to each example, the diopter is adjustable by various methods. For example, the diopter can be adjusted by moving the whole or part of the observation optical system or the display element in the optical axis direction. At this time, an inner focus method may be used that fixes the first lens G1 disposed closest to the observation side and moves the second lens G2 from the viewpoint of the dustproof structure. In addition to the method of moving the lens in the optical axis direction, the diopter is adjustable by an optical element that varies the refractive power by mechanical or electrical action, such as a variable-shape lens using pressure or electrowetting, or a liquid crystal lens.

A specific description will be given of the observation optical systems according to Examples 1 to 4. The observation optical system according to each example can use either the first configuration or the second configuration using polarized light described above.

After the description according to Example 4, numerical examples 1 to 4 corresponding to Examples 1 to 4 will be illustrated. In each numerical example, a surface number i represents the order of the surfaces counted from the observation side (pupil plane side). r represents a radius of curvature (mm) of an i-th surface from the observation side. d represents a lens thickness or air gap (mm) between i-th and (i+1)-th surfaces, and nd represents a refractive index for the d-line of an optical material between the i-th and (i+1)-th surfaces. vd represents an Abbe number based on the d-line of the optical material between the i-th and (i+1)-th surfaces. The Abbe number of a certain material is represented as follows:

$$vd = (Nd - 1)/(NF - NC)$$

where Nd, NF, and NC are refractive indexes of the d-line (587.6 nm), F-line (486.1 nm), and C-line (656.3 nm) in the Fraunhofer line. The effective diameter is a diameter of an area of the i-th surface through which rays contributing to imaging pass, and is also referred to as the optical effective diameter. The overall lens length is a distance on the optical axis from a surface closest to the observation surface (pupil plane) in the observation optical system to the display surface of the display element.

An asterisk "*" attached to the right side of a surface number means that the optical surface is aspheric. The aspherical shape is expressed as follows:

$$x = (h^2/R)/\left[1 + \{1 - (1+k)(h/R)^2\}^{1/2}\right] + A4 \times h^4 + A6 \times h^6 + A8 \times h^8 + A10 \times h^{10}$$

where x is a displacement amount from the surface vertex in the optical axis direction, h is a height from the optical axis in the direction perpendicular to the optical axis, a light traveling direction is set positive, R is a paraxial radius of curvature, k is a conical constant, and A4 to A10 are aspherical coefficients of each order. "e±Z" in each conical constant and aspherical coefficient means "×10$^{\pm Z}$."

Example 1

An observation optical system according to Example 1 (numerical example 1) illustrated in FIG. 1 is an optical system with a full angle of field of about 90 degrees. The observation optical system according to Example 1 includes, in order from the pupil plane SP side to the display surface ID side, a first lens G1 having a concave meniscus shape and negative refractive power, and a second lens G2 having a plano-convex shape and positive refractive power. A first half-transmissive reflective surface HM1 is disposed on a curved surface on the display element side of the first lens G1 that is concave toward the observation side. A second half-transmissive reflective surface HM2 is disposed on a curved surface on the observation side of the second lens G2 that is concave toward the observation side.

The light from the display surface ID transmits through HM2, is reflected on HM1, is reflected on HM2, transmits through HM1, and is guided to the pupil plane SP. The first lens G1 is a negative lens Gn made of a highly dispersive optical material.

In the first configuration using polarized light in this example, QWP1 may be disposed together with PBS as HM1 on the curved surface on the display element side of the first lens G1, QWP2 may be disposed on the flat surface on the observation side of the second lens G2, and the POL may be disposed on a surface on the observation side of the glass block CG.

Table 1 summarizes values of inequalities (1) to (7) in numerical example 1. The observation optical system according to numerical example 1 satisfies all inequalities (1) to (7).

Figure 2:
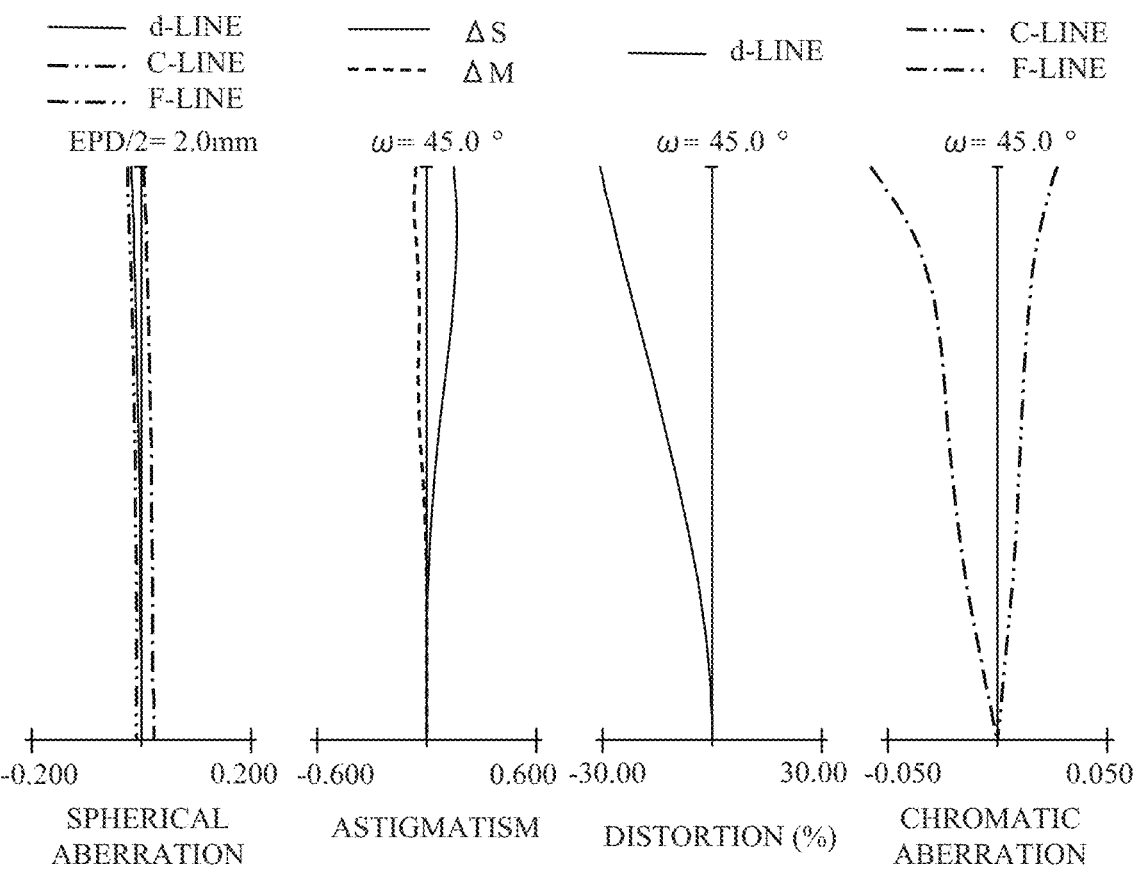
FIG. 2 is a longitudinal aberration diagram of the observation optical system according to Example 1.

FIG. 2 illustrates a longitudinal aberration (spherical aberration, astigmatism, distortion, and lateral chromatic aberration) of the observation optical system (diopter: −0.5 diopter) according to numerical example 1. In the spherical aberration diagram, Fno represents an F-number, a solid line indicates a spherical aberration amount for the d-line, an alternate long and two short dashes line indicates a spherical aberration amount for the C-line, and an alternate long and short dash line indicates a spherical aberration amount for the F-line. In the astigmatism diagram, a solid line ΔS indicates an astigmatism amount on a sagittal image plane, and a broken line ΔM indicates an astigmatism amount on a meridional image plane. The distortion diagram illustrates a distortion amount for the d-line. The lateral chromatic aberration diagram illustrates a lateral chromatic aberration amount for the C-line (alternate long and two short dashes line) and the F-line (alternate long and short dash line). ω represents a half angle of field (°). The description of these longitudinal aberration diagrams is similarly applicable to other numerical examples.

Example 2

Figure 3:
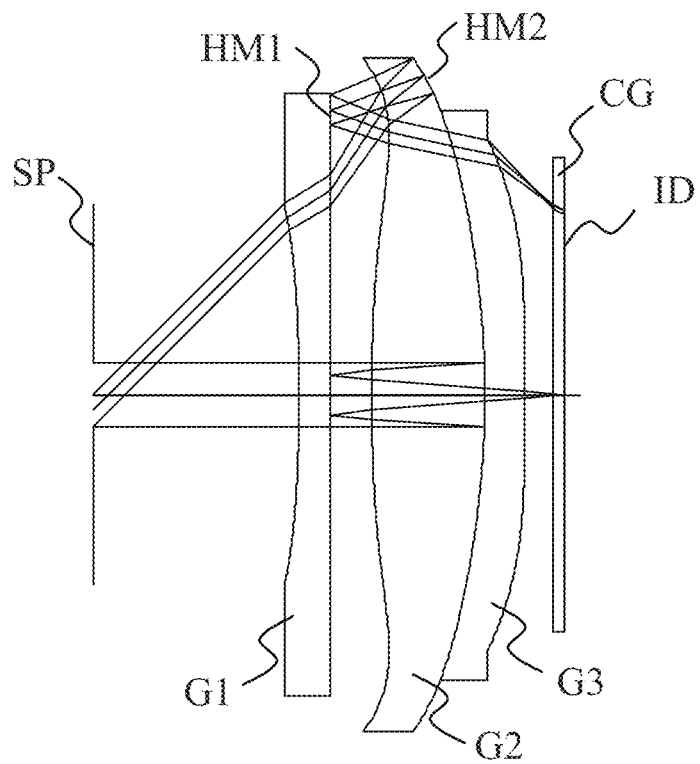
FIG. 3 is a sectional view of an observation optical system according to Example 2.

An observation optical system according to Example 2 (numerical example 2) illustrated in FIG. 3 is an optical system with a full angle of field of about 90 degrees. The observation optical system according to Example 2 includes, in order from the pupil plane SP side to the display surface ID side, a first lens G1 having a concave-planar shape and negative refractive power, and a cemented lens of a second lens G2 having a biconvex shape and positive refractive power and a third lens G3 having a concave meniscus shape and negative refractive power.

A first half-transmissive reflective surface HM1 is disposed on a flat surface on the display element side of the first lens G1. A second half-transmissive reflective surface HM2 is disposed on a curved surface on the display element side of the second lens G2 that is concave toward the observation side (cemented surface with the third lens G3).

The light from the display surface ID transmits through HM2, is reflected on HM1, is reflected on HM2, transmits through HM1, and is guided to the pupil plane SP. The first lens G1 and the third lens G3 are negative lenses Gn made of a highly dispersive optical material.

In this example, the flat surface of the first lens G1 on which the first half-transmissive reflective surface HM1 is disposed facilitates the cementing process of a polarization-selective half-transmissive reflective element in a case where the first half-transmissive reflective surface HM1 includes the polarization selective half-transmissive reflective element.

The first lens G1 and the third lens G3 as negative lenses Gn can satisfactorily correct the chromatic aberration of the entire observation optical system.

Table 1 summarizes values of inequalities (1) to (7) in numerical example 2. The observation optical system according to numerical example 2 satisfies all inequalities (1) to (7).

Figure 4:
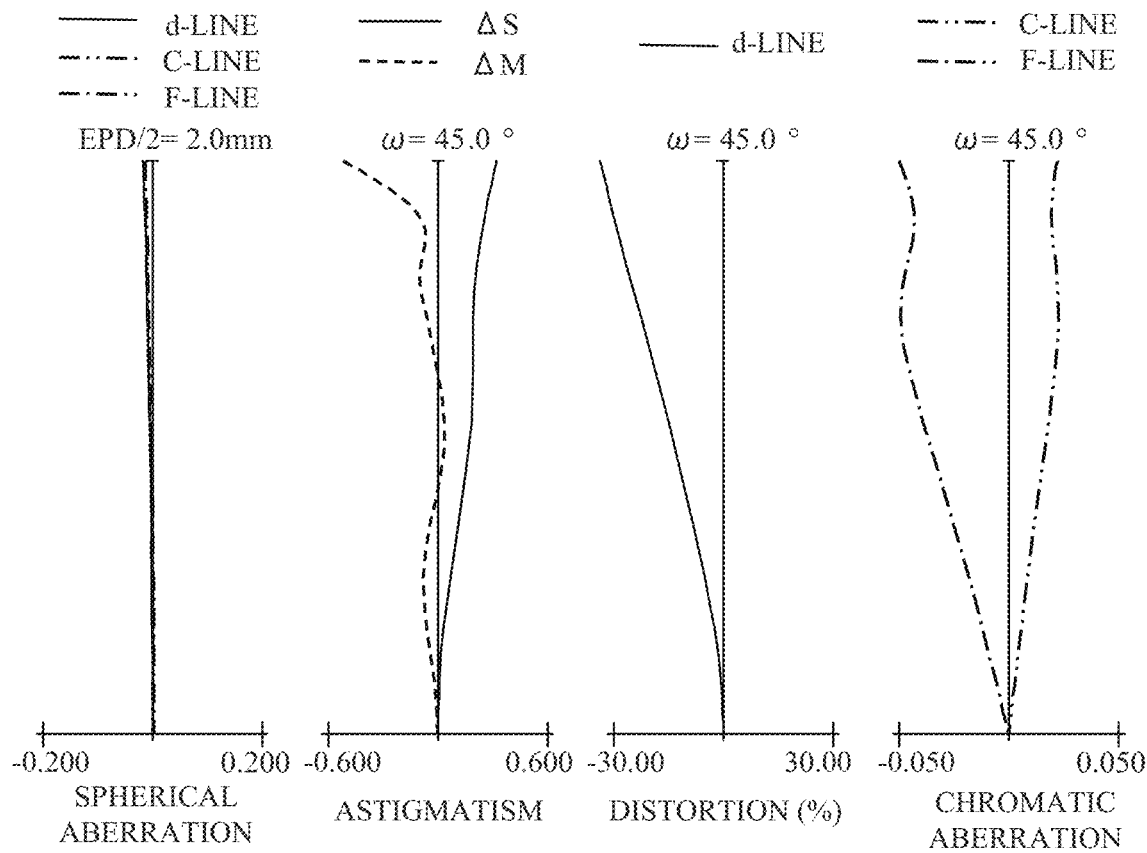
FIG. 4 is a longitudinal aberration diagram of the observation optical system according to Example 2.

FIG. 4 illustrates a longitudinal aberration of the observation optical system (diopter: −0.5 diopter) according to numerical example 2.

Example 3

Figure 5:
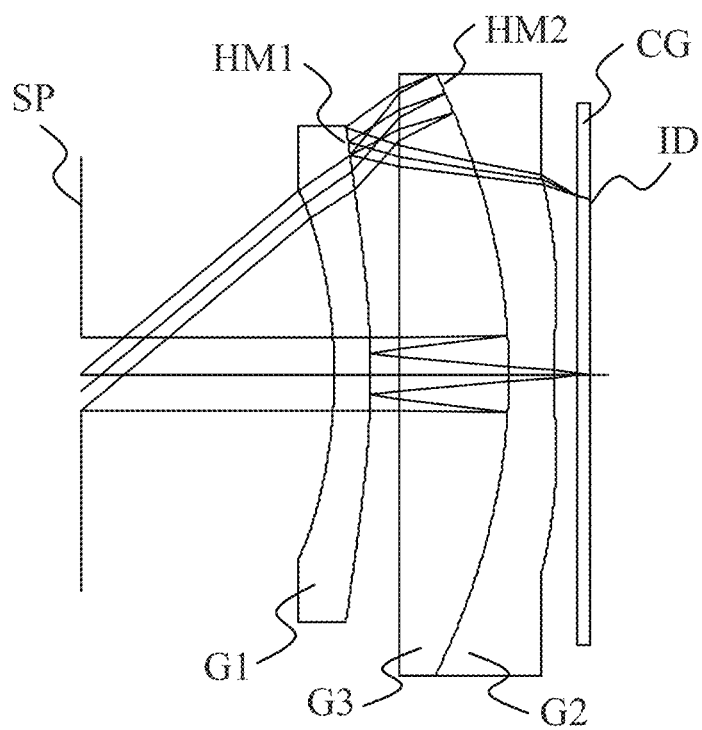
FIG. 5 is a sectional view of an observation optical system according to Example 3.

An observation optical system according to Example 3 (numerical example 3) illustrated in FIG. 5 is an optical system with a full angle of field of about 80 degrees. The observation optical system according to Example 3 includes, in order from the pupil plane SP side to the display surface ID side, a first lens G1 having a concave meniscus shape and negative refractive power, and a cemented lens of a third lens G3 having a plano-convex shape and positive refractive power and a second lens G2 having a biconcave shape and negative refractive power.

A first half-transmissive reflective surface HM1 is disposed on a curved surface on the display element side of the first lens G1 that is concave toward the observation side. A second half-transmissive reflective surface HM2 is disposed on a curved surface (cemented surface with the third lens G3) on the observation side of the second lens G2 that is concave toward the observation side.

The light from the display surface ID transmits through HM2, is reflected on HM1, is reflected on HM2, transmits through HM1, and is guided to the pupil plane SP. The first lens G1 and the second lens G2 are negative lenses Gn.

In this example, the flat surface of the first lens G1 on which the first half-transmissive reflective surface HM1 is disposed facilitates the cementing process of a polarization-selective half-transmissive reflective element in a case where the first half-transmissive reflective surface HM1 includes the polarization-selective half-transmissive reflective element.

The first lens G1 and the second lens G2 as negative lenses Gn can satisfactorily correct the chromatic aberration of the entire observation optical system. In particular, the second lens G2 made of a high-dispersion optical material can effectively correct lateral chromatic aberration.

Table 1 summarizes values of inequalities (1) to (7) in numerical example 3. The observation optical system according to numerical example 3 satisfies all inequalities (1) to (7).

Figure 6:
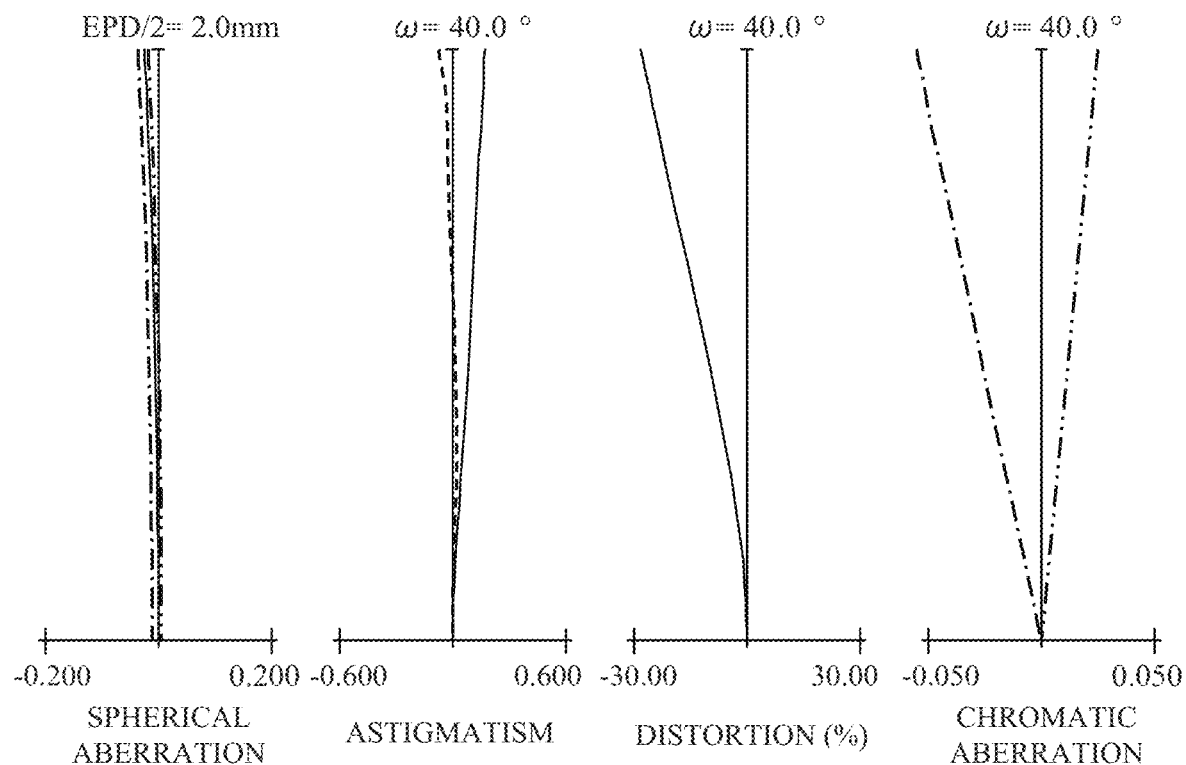
FIG. 6 is a longitudinal aberration diagram of the observation optical system according to Example 3.

FIG. 6 illustrates a longitudinal aberration of the observation optical system (diopter: −0.5 diopter) according to numerical example 3.

Example 4

Figure 7:
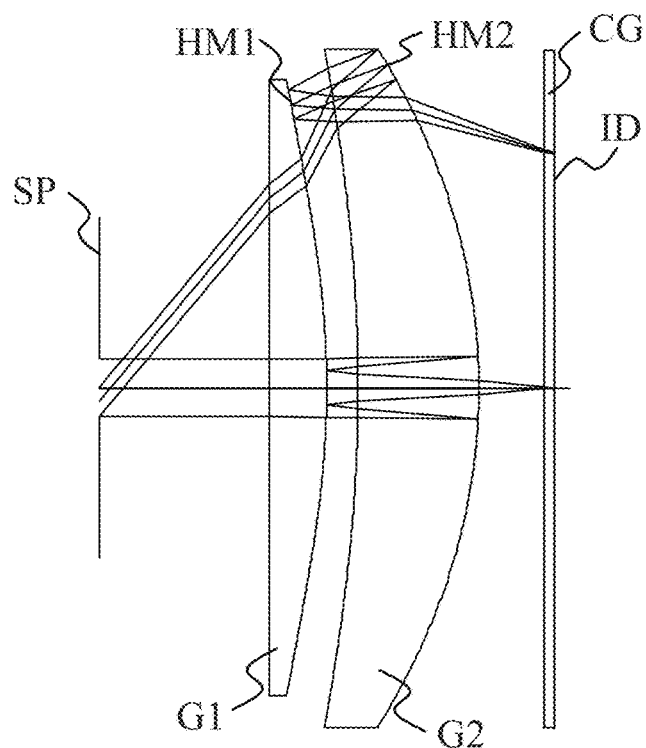
FIG. 7 is a sectional view of an observation optical system according to Example 4.

An observation optical system according to Example 4 (numerical example 4) illustrated in FIG. 7 is an optical system with a full angle of field of about 100 degrees. The observation optical system according to Example 4 includes, in order from the pupil plane SP side to the display surface ID side, a first lens G1 having negative refractive power and a concave Fresnel surface with a flat base on the observation side, and a second lens G2 having a convex meniscus shape and positive refractive power.

A first half-transmissive reflective surface HM1 is disposed on a curved surface on the display element side of the first lens G1 that is concave toward the observation side. A second half-transmissive reflective surface HM2 is disposed on a curved surface on the observation side of the second lens G2 that is concave toward the observation side.

The light from the display surface ID transmits through HM2, is reflected on HM1, is reflected on HM2, transmits through HM1, and is guided to the pupil plane SP. The first lens G1 is a negative lens Gn.

In order to correct chromatic aberration and monochromatic aberration, the surface on the observation side of the first lens G1 may be a curved surface that is concave toward the observation side. However, in increasing the optical effective diameter of each lens and the curvature of the curved surface that is concave toward the observation side for a wide angle of field, a peripheral sag amount of the first lens G1 increases toward the observation side and the eye relief reduces. The flat-based concave Fresnel surface on the observation side of the first lens G1 as in this example can secure the eye relief while providing a refractive surface on the observation side with proper negative refractive power.

Table 1 summarizes values of inequalities (1) to (7) in numerical example 4. The observation optical system according to numerical example 4 satisfies all inequalities (1) to (7).

Figure 8:
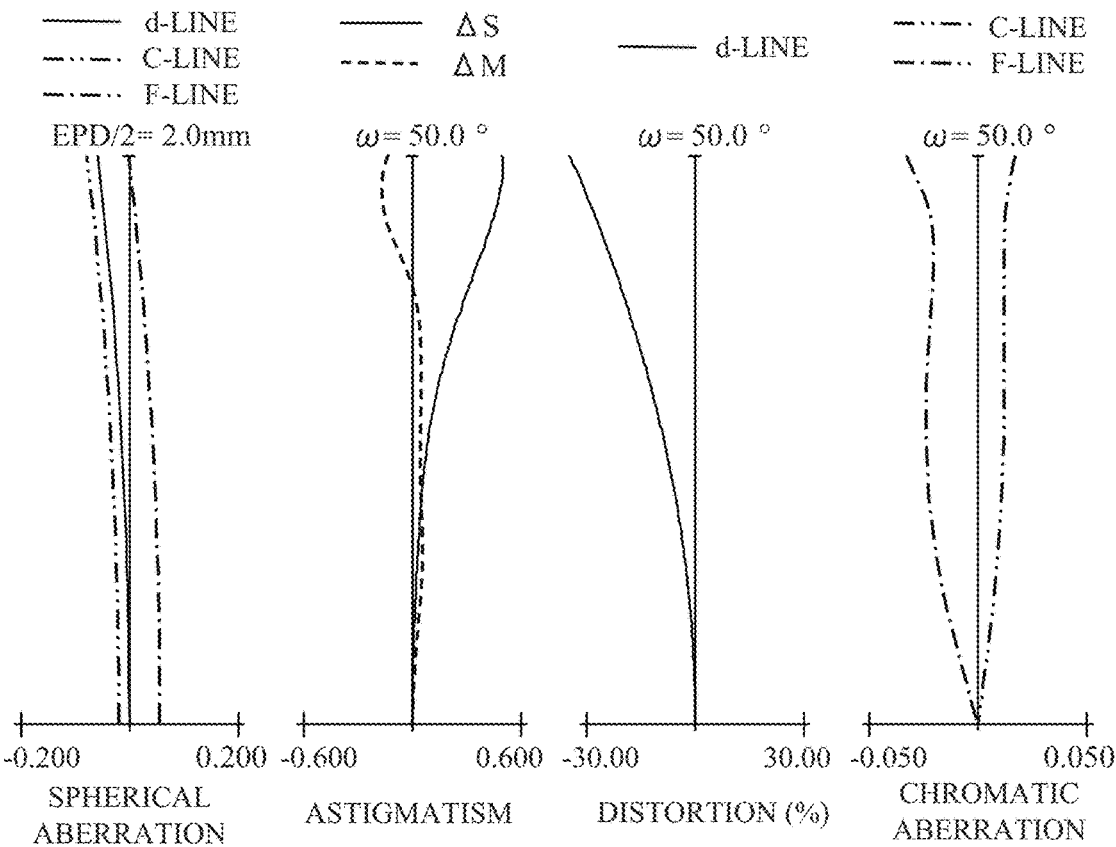
FIG. 8 is a longitudinal aberration diagram of the observation optical system according to Example 4.

FIG. 8 illustrates a longitudinal aberration of the observation optical system (diopter: −0.5 diopter) according to numerical example 4.

Numerical Example 1

UNIT: mm

Surface Data

| Surface No. | r | d | nd | vd | Effective Diameter |
|---|---|---|---|---|---|
| 1 (pupil plane) | ∞ | (Variable) | | | 4.00 |
| 2* | −39.352 | 2.00 | 1.66100 | 20.4 | 24.20 |
| 3* | −66.497 | 1.89 | | | 35.00 |
| 4 | ∞ | 7.83 | 1.49200 | 57.4 | 42.00 |
| 5* | −39.361 | −7.83 | | | 42.00 |
| 6 | ∞ | −1.89 | | | 42.00 |
| 7* | −66.497 | 1.89 | | | 35.00 |
| 8 | ∞ | 7.83 | 1.49200 | 57.4 | 42.00 |
| 9* | −39.361 | 1.45 | | | 42.00 |
| 10 | ∞ | 0.70 | 1.51633 | 64.1 | 30.00 |
| 11 | ∞ | 0.00 | | | 30.00 |
| display surface | ∞ | | | | |

Aspheric Data

2nd Surface $K = 0.00000e+00$ $A\,4 = -7.48059e-07$ $A\,6 = -3.09602e-08$ $A\,8 = -1.86005e-10$ 3rd Surface $K = 0.00000e+00$ $A\,4 = 1.10420e-05$ $A\,6 = -1.23159e-08$ 5th Surface $K = -1.13788e+00$ $A\,4 = -1.09601e-06$ $A\,6 = -1.75150e-10$ $A\,8 = -2.63639e-12$
$A10 = 4.72911e-15$ 7th Surface $K = 0.00000e+00$ $A\,4 = 1.10420e-05$ $A\,6 = -1.23159e-08$ 9th Surface $K = -1.13788e+00$ $A\,4 = -1.09601e-06$ $A\,6 = -1.75150e-10$ $A\,8 = -2.63639e-12$
$A10 = 4.72911e-15$ Various Data

| | |
|---|---|
| Focal Length: | 16.76 |
| Pupil diameter: | 4.00 |
| half angle of field (°): | 45.00 |
| Overall lens length: | 13.63 (in AIR) |
| d 1 | 14.00 |
| Entrance Pupil Position: | 0.00 |
| Exit Pupil Position: | 48.88 |
| Front Principal Point Position: | 22.53 |
| Rear Principal Point Position: | −16.62 |

Lens Unit Data

| Unit | Starting Surface | Focal Length | Overall lens length | Front Principal Point Position | Rear Principal Point Position |
|---|---|---|---|---|---|
| 1 | 2 | 16.76 | 11.72 | 8.53 | −14.71 |

Single Lens Data

| Lens | Starting Surface | Focal Length |
|---|---|---|
| G1 | 1 | −150.24 |
| G2 | 4 | 80.00 |
| CG | 10 | ∞ |

Numerical Example 2

| | UNIT: mm |
|---|---|---|---|---|---|
| | Surface Data |
| Surface No. | r | d | nd | vd | Effective Diameter |
| 1 (pupil plane) | ∞ | (Variable) | | 4.00 | |
| 2* | −126.777 | 2.00 | 1.63500 | 23.9 | 24.20 |
| 3 | ∞ | 2.58 | | 38.00 | |
| 4* | 142.148 | 7.13 | 1.54400 | 56.0 | 42.50 |
| 5* | −58.915 | −7.13 | | | 42.50 |
| 6* | 142.148 | −2.58 | | | 42.50 |
| 7 | ∞ | 2.58 | | 38.00 | |
| 8* | 142.148 | 7.13 | 1.54400 | 56.0 | 36.00 |
| 9* | −58.915 | 2.50 | 1.60700 | 27.0 | 36.00 |
| 10* | 933.545 | 1.84 | | 32.30 | |
| 11 | ∞ | 0.70 | 1.51680 | 64.2 | 30.00 |
| 12 | ∞ | 0.00 | | | 30.00 |
| display surface | ∞ | | | | |

Aspheric Data

2nd Surface $K = 0.00000e+00$ $A4 = -1.94169e-05$ $A6 = 4.86428e-08$ $A8 = -2.17267e-10$ 4th Surface $K = 0.00000e+00$ $A4 = 2.05745e-05$ $A6 = -6.92001e-08$ 5th Surface $K = -1.63982e+01$ $A4 = -6.66421e-06$ $A6 = 2.06294e-08$ $A8 = -7.47409e-11$
$A10 = 4.55146e-14$ 6th Surface $K = 0.00000e+00$ $A4 = 2.05745e-05$ $A6 = -6.92001e-08$ 8th Surface $K = 0.00000e+00$ $A4 = 2.05745e-05$ $A6 = -6.92001e-08$ 9th Surface $K = -1.63982e+01$ $A4 = -6.66421e-06$ $A6 = 2.06294e-08$ $A8 = -7.47409e-11$
$A10 = 4.55146e-14$ 10th Surface $K = 0.00000e+00$ $A4 = -5.94358e-05$ $A6 = 1.30329e-07$ $A8 = -1.52999e-10$ Various Data

| | |
|---|---|
| Focal Length: | 17.51 |
| Pupil diameter | 4.00 |
| half angle of field (°) | 45.00 |
| Overall lens length: | 16.51(in AIR) |
| d 1 | 13.00 |
| Entrance Pupil Position: | 0.00 |
| Exit Pupil Position: | 67.19 |
| Front Principal Point Position: | 22.08 |
| Rear Principal Point Position: | −17.35 |

Lens Unit Data

| Unit | Starting Surface | Focal Length | Overall lens length | Front Principal Point Position | Rear Principal Point Position |
|---|---|---|---|---|---|
| 1 | 2 | 17.51 | 14.21 | 9.08 | −15.06 |

Single Lens Data

| Lens | Starting Surface | Focal Length |
|---|---|---|
| G1 | 1 | −199.65 |
| G2 | 4 | 77.53 |
| G3 | 9 | −91.21 |
| CG | 11 | ∞ |

Numerical Example 3

| | | UNIT: mm | | | |
|---|---|---|---|---|---|
| | | Surface Data | | | |
| Surface No. | r | d | nd | vd | Effective Diameter |
| 1(pupil plane) | ∞ | (Variable) | | | 4.00 |
| 2* | −29.873 | 2.00 | 1.49200 | 57.4 | 20.40 |
| 3* | −48.736 | 1.59 | | | 27.40 |
| 4 | ∞ | 6.04 | 1.54400 | 56.0 | 33.30 |
| 5* | −34.597 | −6.04 | | | 33.30 |
| 6 | ∞ | −1.59 | | | 33.30 |
| 7* | −48.736 | 1.59 | | | 27.40 |
| 8 | ∞ | 6.04 | 1.54400 | 56.0 | 33.30 |
| 9* | −34.597 | 2.50 | 1.64200 | 22.0 | 33.30 |
| 10* | 45.784 | 1.31 | | | 22.00 |
| 11 | ∞ | 0.70 | 1.51680 | 64.2 | 30.00 |
| 12 | ∞ | 0.00 | | | 30.00 |
| display surface | ∞ | | | | |

Aspheric Data

2nd Surface

K = 0.00000e+00 A 4 = 1.46505e−07 A 6 = −7.96364e−08 A 8 = −6.59310e−10

3rd Surface

K = 0.00000e+00 A 4 = 2.29647e−05 A 6 = −3.00982e−08

5th Surface

K = −5.66760e+00 A 4 = −1.39953e−05 A 6 −2.42032e−08 A 8 = −4.77856e−11
A10 = 4.84425e−14

7th Surface

K = 0.00000e+00 A 4 = 2.29647e−05 A 6 = −3.00982e−08

9th Surface

K = −5.66760e+00 A 4 = −1.39953e−05 A 6 = 2.42032e−08 A 8 = −4.77856e−11
A10 = 4.84425e−14

10th Surface

K = 0.00000e+00 A 4 = −3.14198e−04 A 6 = 2.11563e−06 A 8 = −5.53991e−09

Various Data

| Focal Length: | 16.03 |
|---|---|
| Pupil diameter | 4.00 |
| half angle of field (°) | 40.00 |
| Overall lens length: | 13.90(in AIR) |
| d 1 | 14.00 |
| Entrance Pupil Position: | 0.00 |
| Exit Pupil Position: | −147.43 |
| Front Principal Point Position: | 14.29 |
| Rear Principal Point Position: | −15.90 |

Lens Unit Data

| Unit | Starting Surface | Focal Length | Overall lens length | Front Principal Point Position | Rear Principal Point Position |
|---|---|---|---|---|---|
| 1 | 2 | 16.03 | 12.13 | 0.29 | −14.14 |

Single Lens Data

| Lens | Starting Surface | Focal Length |
|---|---|---|
| G1 | 1 | −162.56 |
| G3 | 4 | 63.60 |
| G2 | 9 | −30.33 |
| CG | 11 | ∞ |

Numerical Example 4

| UNIT: mm | | | | | |
|---|---|---|---|---|---|
| Surface Data | | | | | |
| Surface No. | r | d | nd | vd | Effective Diameter |
| 1 (pupil plane) | ∞ | (Variable) | | | 4.00 |
| 2* | ∞ | 4.00 | 1.68000 | 19.4 | 36.80 |
| 3* | −60.519 | 2.21 | | | 42.00 |
| 4* | −111.765 | 8.50 | 1.54400 | 56.0 | 50.00 |
| 5* | −42.395 | −8.50 | | | 50.00 |
| 6* | −111.765 | −2.21 | | | 50.00 |
| 7* | −60.519 | 2.21 | | | 42.00 |
| 8* | −111.765 | 8.50 | 1.54400 | 56.0 | 50.00 |
| 9* | −42.395 | 4.59 | | | 50.00 |
| 10 | ∞ | 0.70 | 1.51680 | 64.2 | 50.00 |
| 11 | ∞ | 0.00 | | | 50.00 |
| display surface | ∞ | | | | |

Aspheric Data

2nd Surface (Fresnel surface with flat base)

R = −3.61989e+01
K = −5.55719e+00 A 4 = −3.75810e−06 A 6 = −1.18256e−08 A 8 = −1.19864e−11

3rd Surface

K = 0.00000e+00 A 4 = 6.66609e−06 A 6 = −2.61379e−09

4th Surface

K = 0.00000e+00 A 4 = 6.50527e−07

5th Surface

K = −5.55719e+00 A 4 = −8.32895e−06 A 6 = 7.90557e−09 A 8 = −7.95730e−12
A10 = 4.08906e−15

6th Surface

K = 0.00000e+00 A 4 = 6.50527e−07

7th Surface

K = 0.00000e+00 A 4 = 6.66609e−06 A 6 = −2.61379e−09

8th Surface

K = 0.00000e+00 A 4 = 6.50527e−07

9th Surface

K = −5.55719e+00 A 4 = −8.32895e−06 A 6 = 7.90557e−09 A 8 = −7.95730e−12
A10 = 4.08906e−15

Various Data

| | |
|---|---|
| Focal Length: | 21.09 |
| Pupil diameter | 4.00 |
| half angle of field (°) | 50.00 |
| Overall lens length: | 19.76(in AIR) |
| d 1 | 12.00 |
| Entrance Pupil Position: | 0.00 |
| Exit Pupil Position: | 2445.33 |
| Front Principal Point Position: | 21.32 |
| Rear Principal Point Position: | −20.84 |

Lens Unit Data

| Unit | Starting Surface | Focal Length | Overall lens length | Front Principal Point Position | Rear Principal Point Position |
|---|---|---|---|---|---|
| 1 | 2 | 21.09 | 14.71 | 9.32 | −15.79 |

Single Lens Data

| Lens | Starting Surface | Focal Length |
|---|---|---|
| G1 | 1 | −141.92 |
| G2 | 4 | 120.36 |
| CG | 10 | 0.00 |

TABLE 1

| INEQUALITY | LOWER LIMIT | UPPER LIMIT | NUMERICAL EXAMPLE 1 | NUMERICAL EXAMPLE 2 |
|---|---|---|---|---|
| (1) | 1.0 | 20.0 | 8.963 | 11.404    5.210 |
| (2) | 10.0 | 40.0 | 20.4 | 23.9    27.0 |
| (3) | −1.1 | −0.1 | −0.532 | −0.391 |
| (4) | 1.0 | 8.0 | 4.773 | 4.429 |
| (5) | −5.0 | −1.0 | −2.442 | −2.984 |
| (6) | −0.2 | 1.0 | 0.440 | 0.000 |
| (7) | 0.5 | 1.5 | 0.813 | 0.943 |
| NEGATIVE LENS Gn | | | G1 | G1    G3 |
| POSITIVE LENS HAVING THE LARGEST REFRACTIVE POWER | | | G2 | G2 |
| REFERENCE RADIUS OF CURVATURE OF HALF-TRANSMISSIVE REFLECTIVE SURFACE HM1 OF FIRST LENS | | | −92.954 | inf |
| REFERENCE RADIUS OF CURVATURE OF HALF-TRANSMISSIVE REFLECTIVE SURFACE HM2 OF SECOND LENS | | | −40.935 | −52.244 |

| INEQUALITY | LOWER LIMIT | UPPER LIMIT | NUMERICAL EXAMPLE 3 | NUMERICAL EXAMPLE 4 |
|---|---|---|---|---|
| (1) | 1.0 | 20.0 | 10.140    1.892 | 6.728 |
| (2) | 10.0 | 40.0 | —    22.0 | 19.4 |
| (3) | −1.1 | −0.1 | −0.391 | −0.848 |
| (4) | 1.0 | 8.0 | 3.967 | 5.706 |
| (5) | −5.0 | −1.0 | −2.265 | −2.084 |
| (6) | −0.2 | 1.0 | 0.519 | 0.527 |
| (7) | 0.5 | 1.5 | 0.867 | 0.937 |
| NEGATIVE LENS Gn | | | G1    G2 | G1 |
| POSITIVE LENS HAVING THE LARGEST REFRACTIVE POWER | | | G3 | G2 |
| REFERENCE RADIUS OF CURVATURE OF HALF-TRANSMISSIVE REFLECTIVE SURFACE HM1 OF FIRST LENS | | | −69.925 | −83.373 |
| REFERENCE RADIUS OF CURVATURE OF HALF-TRANSMISSIVE REFLECTIVE SURFACE HM2 OF SECOND LENS | | | −36.303 | −43.959 |

Image Display Apparatus

Figure 11:
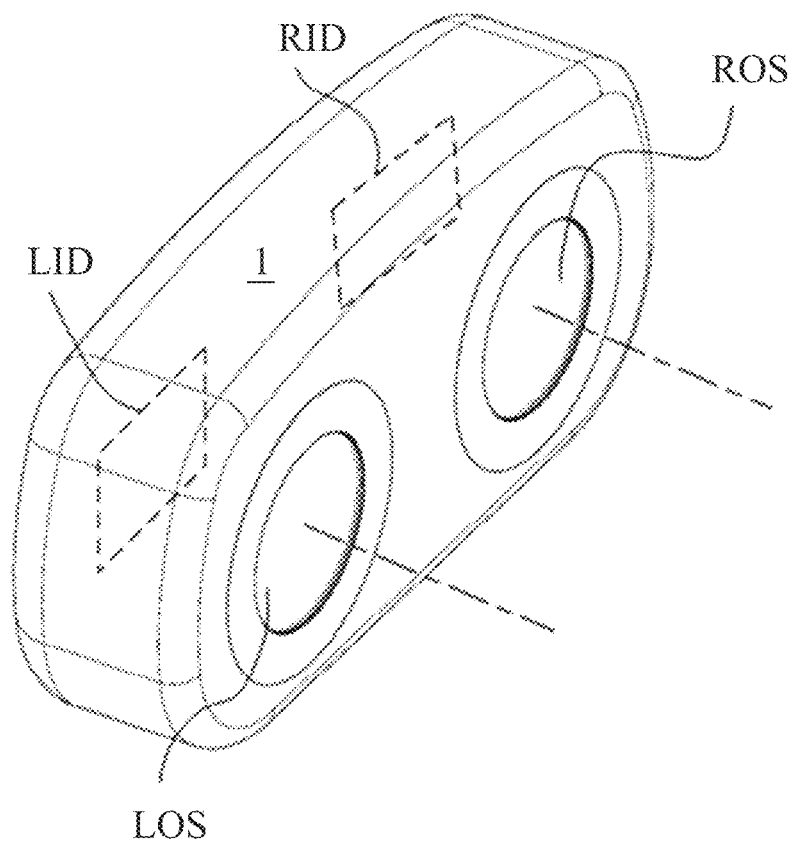
FIG. 11 illustrates an HMD using the observation optical system according to any one of Examples 1 to 3.

FIG. 11 illustrates a head mount display (HMD) as an image display apparatus using the observation optical system according to any one of Examples 1 to 4. The HMD is mounted on the observer's head (in front of his eyes) by an unillustrated attachment gear.

The HMD includes right-eye and left-eye image display elements RID and LID, a right-eye observation optical system ROS that guides display light from the right-eye image display element RID to the observer's right eye, and a left-eye observation optical system LOS that guides display light from the left-eye image display element LID to the observer's left eye.

The observation optical systems illustrated in Examples 1 to 4 as the right-eye and left-eye observation optical systems ROS and LOS can realize the HMD that has a reduced size and provide a high-quality image with a wide angle of field.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide an optical system with high optical performance that satisfactorily corrects chromatic aberration, a wide field, and a reduced size.

This application claims priority to Japanese Patent Application No. 2023-084164, which was filed on May 22, 2023, and which is hereby incorporated by reference herein in its entirety.

What is claimed is:

1. An optical system configured to guide light from a display element to an observation side, the optical system comprising:
   a first lens having a first half-transmissive reflective surface provided to a surface on a display element side of the first lens; and
   a second lens having a second half-transmissive reflective surface,
   wherein the light from the display element transmits through the second half-transmissive reflective surface, is reflected on the first half-transmissive reflective surface, is reflected on the second half-transmissive reflective surface, transmits through the first half-transmissive reflective surface, and is guided to the observation side,
   wherein one of the first lens, the second lens, and another lens has negative refractive power,
   wherein the first lens has a concave surface facing the observation side, and
   wherein the following inequality is satisfied:

$$1.0 \le |fn/f| \le 20.0$$

$$10.0 \le vdn \le 40.0$$

where fn is a focal length of the one having the negative refractive power, f is a focal length of the optical system, vdn is an Abbe number of the one having the negative refractive power based on d-line.

2. The optical system according to claim 1, wherein the light from the display element transmits through the one having the negative refractive power only once and is guided to the observation side.

3. The optical system according to claim 1, wherein the one having the negative refractive power is made of a resin material.

4. The optical system according to claim 1, wherein the following inequality is satisfied:

$$-1.1 \le fp/fn \le -0.1$$

where fp is a focal length of a positive lens having largest refractive power among at least one positive lens included in the optical system.

5. The optical system according to claim 1, wherein the following inequality is satisfied:

$$1.0 \le fp/f \le 8.0$$

where fp is a focal length of a positive lens having largest refractive power among at least one positive lens included in the optical system.

6. The optical system according to claim 1, wherein the following inequality is satisfied:

$$-5.0 \le HM2\_refR/f \le -1.0$$

where HM2_refR is a radius of curvature of a spherical surface passing through a surface vertex of the second half-transmissive reflective surface on an optical axis of the optical system and an end position of an optical effective diameter of the second half-transmissive reflective surface.

7. The optical system according to claim 1, wherein the following inequality is satisfied:

$$-0.2 \leq HM2\_refR/HM1\_refR \leq 1.0$$

where HM1_refR is a radius of curvature of a spherical surface passing through a surface vertex of the first half-transmissive reflective surface on an optical axis of the optical system and an end position of an optical effective diameter of the first half-transmissive reflective surface, and HM2_refR is a radius of curvature of a spherical surface passing through a surface vertex of the second half-transmissive reflective surface on an optical axis of the optical system and an end position of an optical effective diameter of the second half-transmissive reflective surface.

8. The optical system according to claim 1, wherein the following inequality is satisfied:

$$0.5 \leq OAL/f \leq 1.5$$

where OAL is a distance on an optical axis from a surface closest to a pupil plane in the optical system to a display surface of the display element.

9. The optical system according to claim 1, wherein the one having the negative refractive power is disposed closest to a pupil plane in the optical system.

10. The optical system according to claim 9, wherein the first lens is the one having the negative refractive power.

11. The optical system according to claim 1, wherein the first half-transmissive reflective surface is provided to a curved surface of the first lens.

12. The optical system according to claim 1, wherein the one having the negative refractive power is disposed closer to the display element than the first lens.

13. The optical system according to claim 12, wherein the other lens is the one having the negative refractive power and is cemented to the second lens.

14. The optical system according to claim 13, wherein the second half-transmissive reflective surface is provided to a cemented surface between the second lens and the one having the negative refractive power.

15. The optical system according to claim 1, wherein the first half-transmissive reflective surface is provided to a flat surface of the first lens.

16. An optical system configured to guide light from a display element to an observation side, the optical system comprising:
   a first lens having a first half-transmissive reflective surface; and
   a second lens having a second half-transmissive reflective surface,
   wherein the light from the display element transmits through the second half-transmissive reflective surface, is reflected on the first half-transmissive reflective surface, is reflected on the second half-transmissive reflective surface, transmits through the first half-transmissive reflective surface, and is guided to the observation side,
   wherein one of the first lens, the second lens, and another lens has negative refractive power, and
   wherein the light from the display element transmits through the one having the negative refractive power only once and is guided to the observation side, wherein the following inequality is satisfied:

$$10.0 \leq vdn \leq 40.0$$

where vdn is an Abbe number of the one having the negative refractive power based on d-line.

17. The optical system according to claim 16, wherein the first half-transmissive reflective surface is provided to a surface on a display element side of the first lens, and
   wherein the second half-transmissive reflective surface is provided to a surface on the observation side or the display element side of the second lens.

18. The optical system according to claim 16, wherein the one having the negative refractive power is made of a resin material.

19. The optical system according to claim 16, wherein the following inequality is satisfied:

$$-1.1 \leq fp/fn \leq -0.1$$

where fp is a focal length of a positive lens having largest refractive power among at least one positive lens included in the optical system.

20. The optical system according to claim 16, wherein the following inequality is satisfied:

$$1.0 \leq fp/f \leq 8.0$$

where fp is a focal length of a positive lens having largest refractive power among at least one positive lens included in the optical system.

21. The optical system according to claim 16, wherein the following inequality is satisfied:

$$-5.0 \leq HM2\_refR/f \leq -1.0$$

where HM2_refR is a radius of curvature of a spherical surface passing through a surface vertex of the second half-transmissive reflective surface on an optical axis of the optical system and an end position of an optical effective diameter of the second half-transmissive reflective surface.

22. The optical system according to claim 16, wherein the following inequality is satisfied:

$$-0.2 \leq HM2\_refR/HM1\_refR \leq 1.0$$

where HM1_refR is a radius of curvature of a spherical surface passing through a surface vertex of the first half-transmissive reflective surface on an optical axis of the optical system and an end position of an optical effective diameter of the first half-transmissive reflective surface, and HM2_refR is a radius of curvature of a spherical surface passing through a surface vertex of the second half-transmissive reflective surface on an optical axis of the optical system and an end position of an optical effective diameter of the second half-transmissive reflective surface.

23. The optical system according to claim 16, wherein the following inequality is satisfied:

$$0.5 \leq OAL/f \leq 1.5$$

where OAL is a distance on an optical axis from a surface closest to a pupil plane in the optical system to a display surface of the display element.

24. The optical system according to claim 16, wherein the one having the negative refractive power is disposed closest to a pupil plane in the optical system.

25. The optical system according to claim 24, wherein the first lens is the one having the negative refractive power.

26. The optical system according to claim 16, wherein the first half-transmissive reflective surface is provided to a curved surface of the first lens.

27. The optical system according to claim 16, wherein the one having the negative refractive power is disposed closer to the display element than the first lens.

28. The optical system according to claim 27, wherein the other lens is the one having the negative refractive power and is cemented to the second lens.

29. The optical system according to claim 28, wherein the second half-transmissive reflective surface is provided to a cemented surface between the second lens and the one having the negative refractive power.

30. The optical system according to claim 16, wherein the first half-transmissive reflective surface is provided to a flat surface of the first lens.

31. A display apparatus comprising:
an optical system configured to guide light from a display element to an observation side; and
the display element,
wherein the optical system includes:
a first lens having a first half-transmissive reflective surface provided to a surface on a display element side of the first lens; and
a second lens having a second half-transmissive reflective surface,
wherein the light from the display element transmits through the second half-transmissive reflective surface, is reflected on the first half-transmissive reflective surface, is reflected on the second half-transmissive reflective surface, transmits through the first half-transmissive reflective surface, and is guided to the observation side,
wherein one of the first lens, the second lens, and another lens has negative refractive power,
wherein the first lens has a concave surface facing the observation side, and
wherein the following inequality is satisfied:

$$1.0 \le |fn/f| \le 20.0$$
$$10.0 \le vdn \le 40.0$$

where fn is a focal length of the one having the negative refractive power, f is a focal length of the optical system, and vdn is an Abbe number of the one having the negative refractive power based on d-line.

32. A display apparatus comprising:
an optical system configured to guide light from a display element to an observation side; and
the display element,
wherein the optical system includes:
a first lens having a first half-transmissive reflective surface; and
a second lens having a second half-transmissive reflective surface,
wherein the light from the display element transmits through the second half-transmissive reflective surface, is reflected on the first half-transmissive reflective surface, is reflected on the second half-transmissive reflective surface, transmits through the first half-transmissive reflective surface, and is guided to the observation side,
wherein one of the first lens, the second lens, and another lens has negative refractive power, and
wherein the light from the display element transmits through the one having the negative refractive power only once and is guided to the observation side,
wherein the following inequality is satisfied:

$$10.0 \le vdn \le 40.0$$

where vdn is an Abbe number of the one having the negative refractive power based on d-line.

33. An optical system configured to guide light from a display element to an observation side, the optical system comprising:
a first lens having a first half-transmissive reflective surface provided to a surface on a display element side of the first lens; and
a second lens having a second half-transmissive reflective surface,
wherein the light from the display element transmits through the second half-transmissive reflective surface, is reflected on the first half-transmissive reflective surface, is reflected on the second half-transmissive reflective surface, transmits through the first half-transmissive reflective surface, and is guided to the observation side,
wherein one of the first lens, the second lens, and another lens has negative refractive power,
wherein the first half-transmissive reflective surface has a curved shape, and
wherein the following inequality is satisfied:

$$1.0 \le |fn/f| \le 20.0$$
$$10.0 \le vdn \le 40.0$$

where fn is a focal length of the one having the negative refractive power, f is a focal length of the optical system, and vdn is an Abbe number of the one having the negative refractive power based on d-line.

* * * * *